(12) United States Patent
Numano

(10) Patent No.: US 7,278,112 B2
(45) Date of Patent: Oct. 2, 2007

(54) PORTABLE INFORMATION APPARATUS

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 339 days.

(21) Appl. No.: 10/077,933

(22) Filed: Feb. 20, 2002

(65) Prior Publication Data
US 2002/0133761 A1 Sep. 19, 2002

(30) Foreign Application Priority Data
Feb. 20, 2001 (JP) .............................. 2001-043690

(51) Int. Cl.
*G06F 17/00* (2006.01)
(52) U.S. Cl. .................................................... 715/778
(58) Field of Classification Search ................ 345/156, 345/173–178, 700, 800; 715/778, 786, 779 715/830, 834, 835, 841
See application file for complete search history.

(56) References Cited

U.S. PATENT DOCUMENTS

| | | | | |
|---|---|---|---|---|
| 5,710,576 | A * | 1/1998 | Nishiyama et al. | 345/169 |
| 5,768,164 | A * | 6/1998 | Hollon, Jr. | 708/174 |
| 5,877,695 | A | 3/1999 | Kubes et al. | 340/815.4 |
| 6,073,187 | A * | 6/2000 | Jacobs et al. | 710/14 |
| 6,252,511 | B1 * | 6/2001 | Mondshine et al. | 340/636.1 |
| 6,286,109 | B1 * | 9/2001 | Pirdy | 713/340 |
| 6,385,466 | B1 * | 5/2002 | Hirai et al. | 455/566 |
| 6,404,623 | B1 * | 6/2002 | Koshika | 361/681 |
| 6,633,930 | B2 * | 10/2003 | Sonehara et al. | 710/62 |
| 6,670,950 | B1 * | 12/2003 | Chin et al. | 345/173 |

FOREIGN PATENT DOCUMENTS

| | | |
|---|---|---|
| JP | 05-095355 | 4/1993 |
| JP | 6-12144 A | 1/1994 |
| JP | 06-334800 | 12/1994 |
| JP | 10-031571 | 2/1998 |
| JP | 11-119875 | 4/1999 |
| JP | 11-184589 | 7/1999 |
| JP | 11-205432 | 7/1999 |
| JP | 2000-284858 A | 10/2000 |
| JP | 2000-322185 A | 11/2000 |

* cited by examiner

*Primary Examiner*—Kristine Kincaid
*Assistant Examiner*—Thanh Vu
(74) *Attorney, Agent, or Firm*—Finnegan, Henderson, Farabow, Garrett & Dunner, L.L.P.

(57) ABSTRACT

This invention is directed to a portable information apparatus, which includes a main display, a sub-display provided independently of the main display, detection means for detecting information that the user must be informed of, and display control means for displaying a message indicating the information that the user must be informed of on the sub-display when the detection means detects this information.

12 Claims, 20 Drawing Sheets

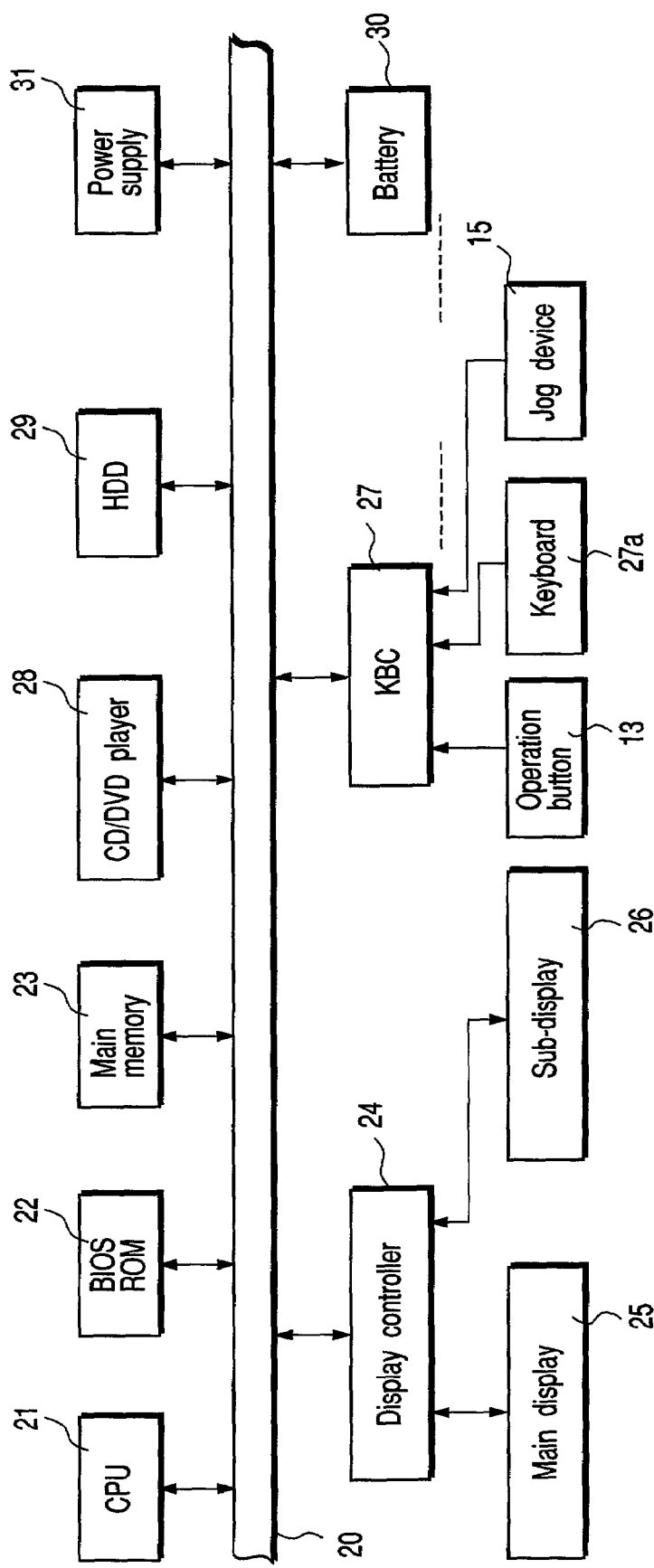
F I G. 6

| Order | Title name | Function of application |
|---|---|---|
| 1 | CD/DVD | • Start CD playback application when CD is loaded<br>• Start DVD playback application when DVD is loaded |
| 2 | Digital Audio | Application for playing back digital audio data |
| 3 | Television | Application used to watch TV |
| 4 | -------- | Application designation by user |
| 5 | -------- | |
| 6 | Mail | Mail Application |
| 7 --- | Internet | Internet browser |

FIG. 15

[Status display type]

| Status display | Function |
|---|---|
| No status display | Mode for always displaying title name of application even when no application is running |
| New arrival mail count display | Mode for displaying number of new arrival mail message in system OFF and sleep states when no application is running while system is active |
| Owner string display | Mode for displaying character string (owner string) set by user in system OFF and sleep states when no application is running while system is active |

FIG. 16

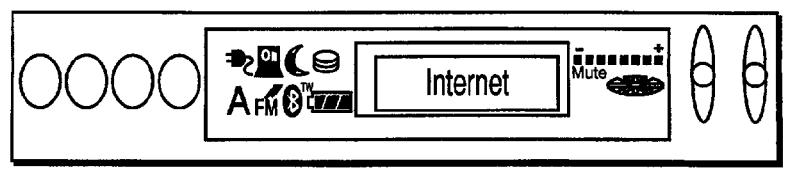
F I G. 17
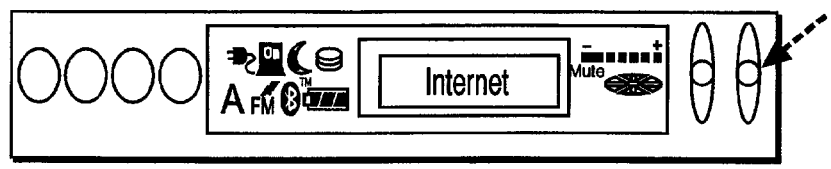
F I G. 18
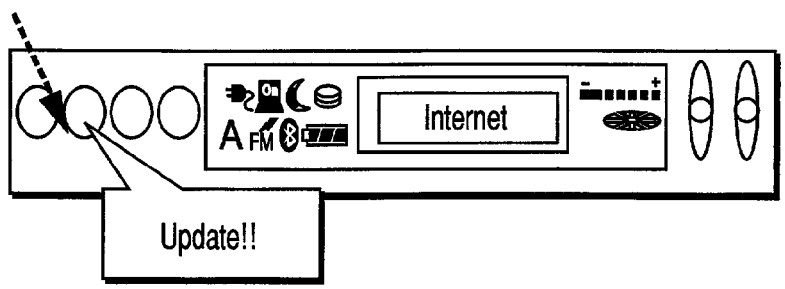
F I G. 19
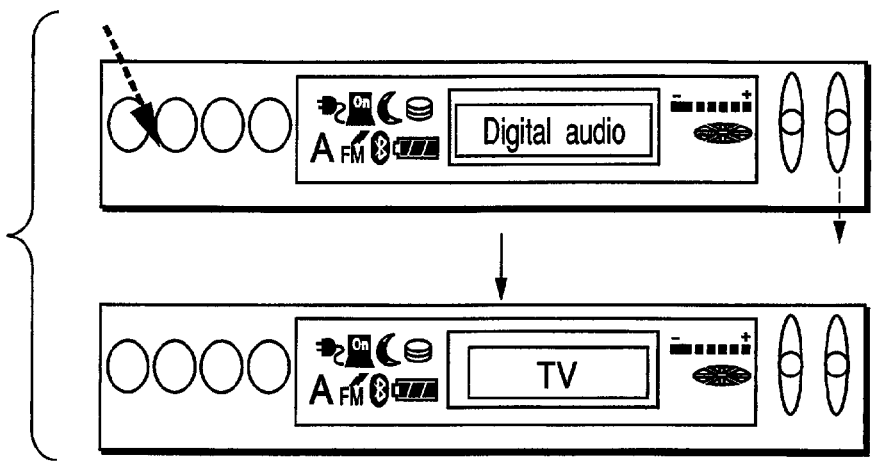
F I G. 20

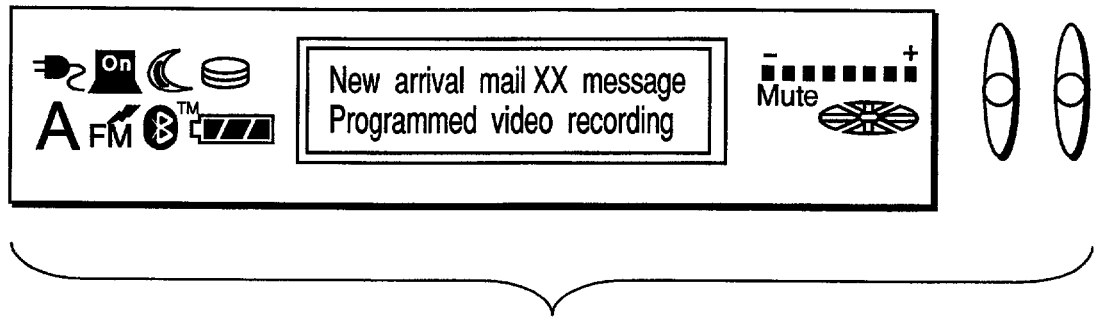
F I G. 22
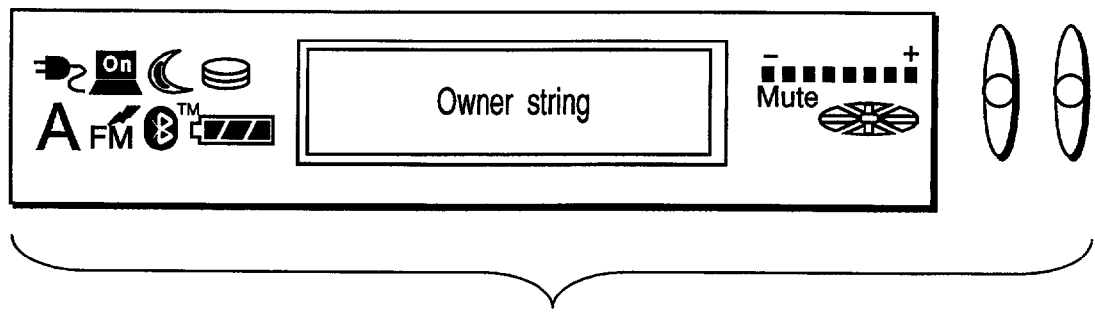
F I G. 23

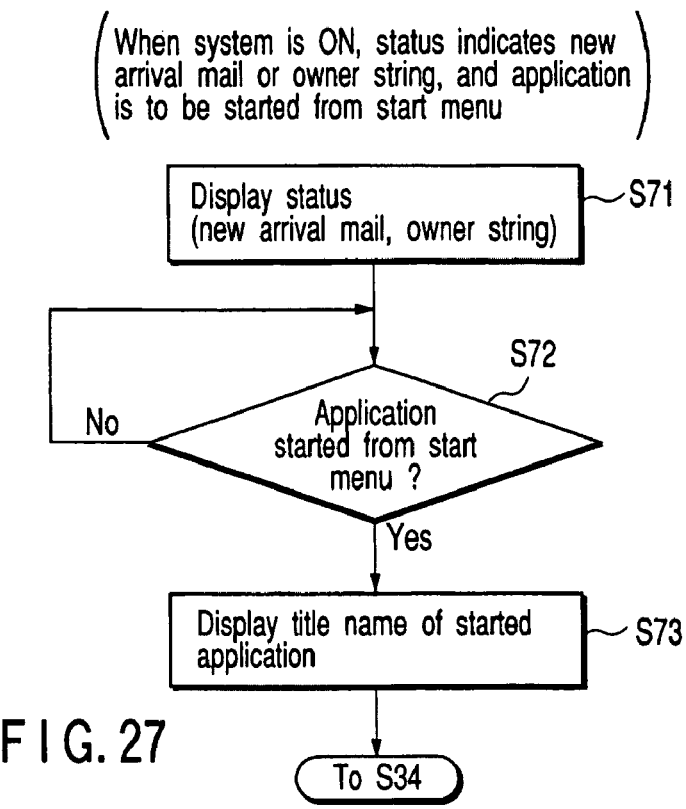

FIG. 27

[Started and operation of application]

| System state | Status display | Operation |
|---|---|---|
| OFF, sleep | None | Start by single action by pressing select jog |
| | | Select application by select jog and then start application |
| | New arrival mail or owner string | Select application by select jog and then start application |
| ON | None | Select, start and switch application by select jog |
| | New arrival mail or owner string | Select, start and switch application by select jog |
| | | Start application from start menu |
| | | End application |

FIG. 28

| Type of window | Operation |
|---|---|
| Title display | Display additional information under title display |
| Status display | Update new arrival mail check count |
| Popup display | Display popup by interrupting Display of another application |
| | Display popup by interrupting title display of another application in case of new arrival mail) |
| | Display system message |
FIG. 29
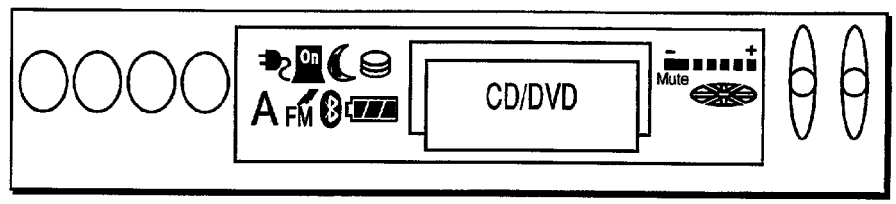
FIG. 30
FIG. 31
FIG. 32
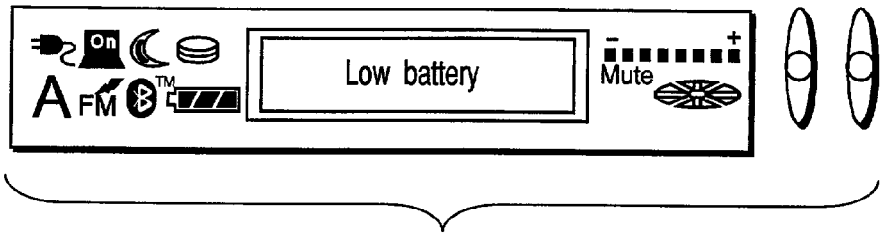
FIG. 33

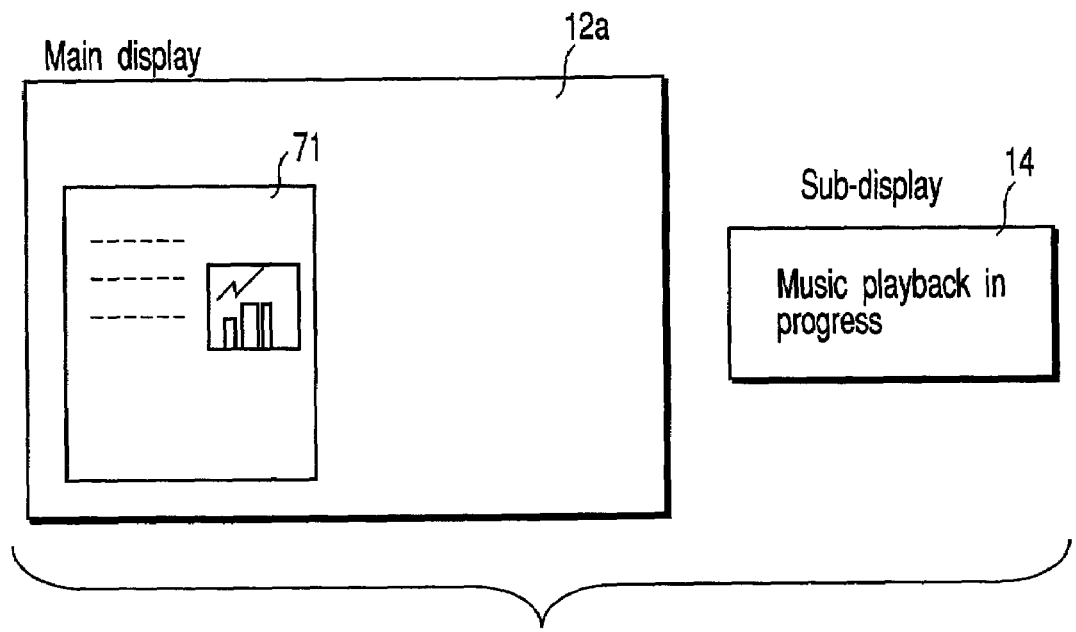
F I G. 38
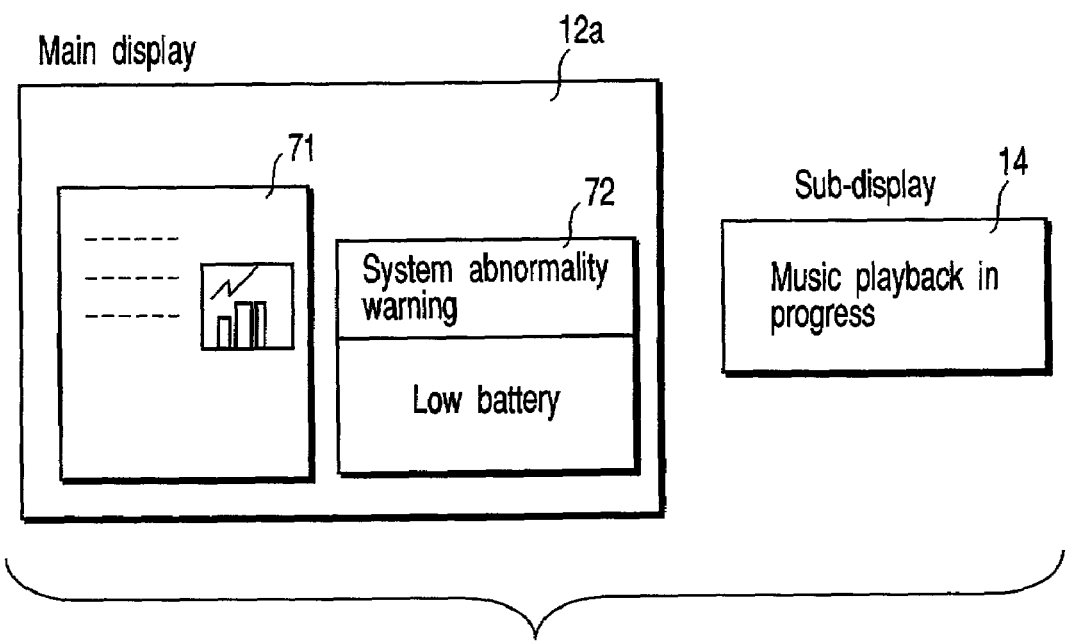
F I G. 39

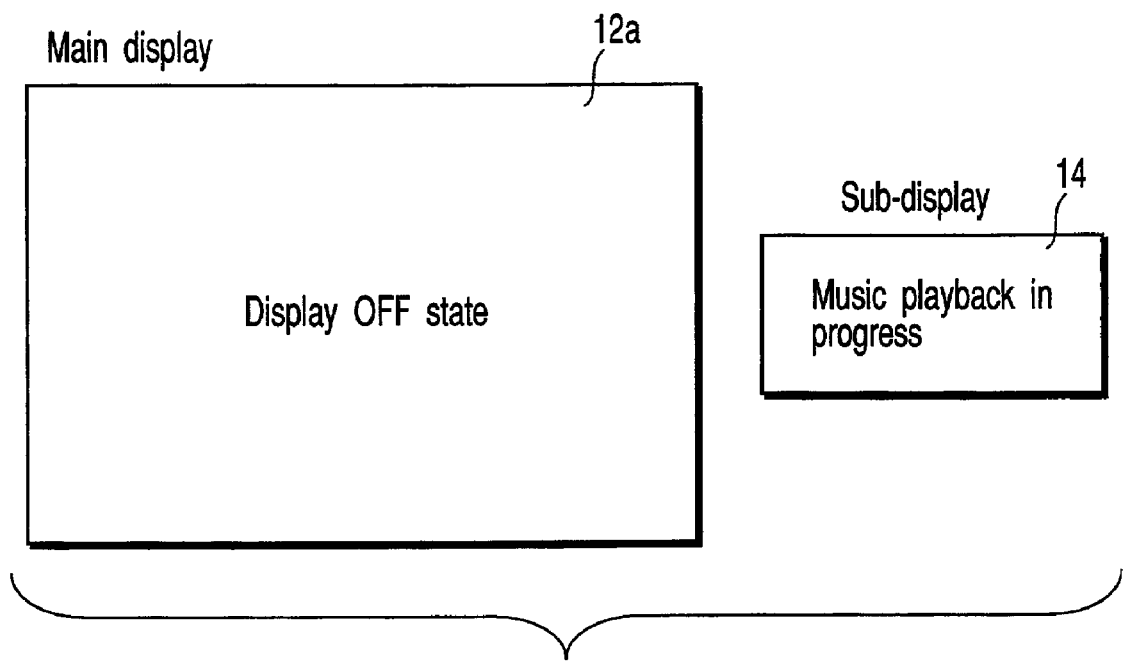
F I G. 40
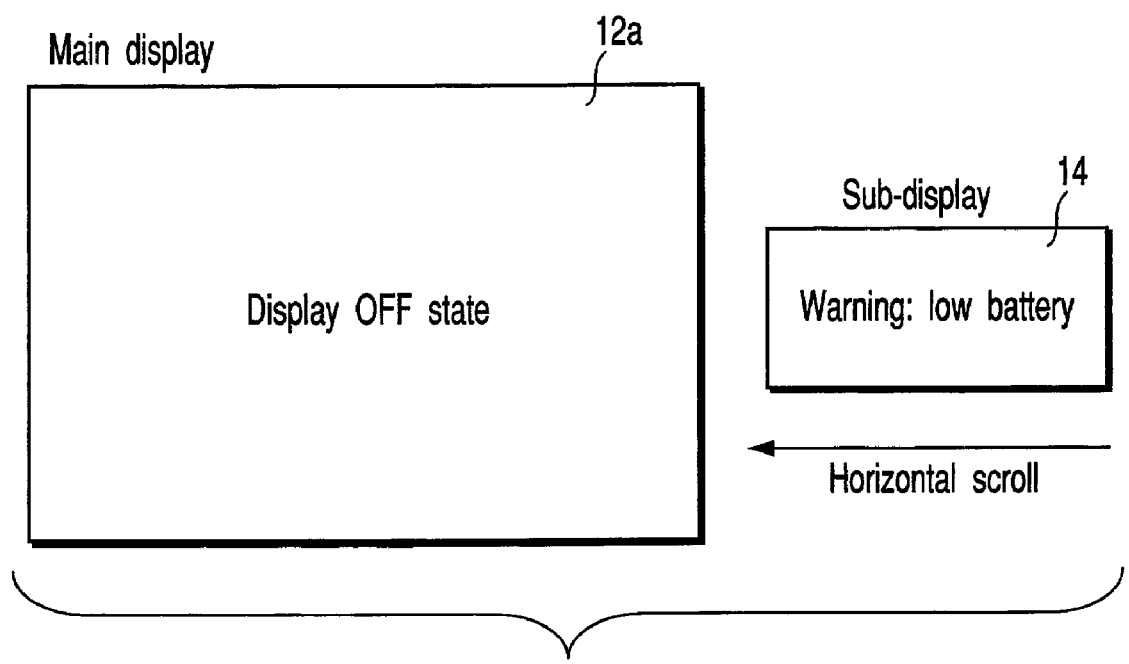
F I G. 41

PORTABLE INFORMATION APPARATUS

CROSS-REFERENCE TO RELATED APPLICATIONS

This application is based upon and claims the benefit of priority from the prior Japanese Patent Application No. 2001-043690, filed Feb. 20, 2001, the entire contents of which are incorporated herein by reference.

BACKGROUND OF THE INVENTION

1. Field of the Invention

The present invention relates to a portable information apparatus and, more particularly, to a notebook type personal having a sub-display in addition to a main display.

2. Description of the Related Art

In a conventional notebook type personal computer, means for giving a warning message associated with hardware such as a low battery message, and abnormality and interrupt messages of a program generates warning by means of alarm sound or displays such messages on a display of the notebook type personal computer.

In some conventional notebook type personal computers, a plurality of applications are selected and started from a jog device. In this case, the names of applications to be started are displayed on the display (main display) of the notebook type personal computer.

However, in the aforementioned notebook type personal computer, if nobody is present around the computer upon producing alarm sound, or if the display of the notebook type personal computer is OFF and the display panel is closed, the user cannot confirm such message.

In the notebook type personal computer which selects an application to be started using the jog device, since the application to be started is displayed on the display of the notebook type personal computer, if the notebook type personal computer is in a power OFF or sleep state, and the display is OFF, an application to be started cannot be selected.

Note that some conventional notebook type personal computers have buttons for starting an application from power OFF and sleep states. However, since one button is assigned per application to be started, buttons are required in correspondence with the number of applications to be started.

BRIEF SUMMARY OF THE INVENTION

The present invention has been made in consideration of the above situation, and has as its object to provide a portable information apparatus which comprises a sub-display in addition to a main display, and can start an arbitrary application to be started even when the user cannot make any confirmation by means of alarm sound or display on the main display, and even in a power OFF state.

According to an aspect of the present invention, there is provided a portable information apparatus comprising: a main display; a sub-display provided independently of the main display; a detection device detecting an operating state of the portable information apparatus; and a display control device displaying a message indicating an abnormal state of the portable information apparatus on the sub-display when the detection device detects the abnormal state of the portable information apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a schematic block diagram showing the arrangement of a notebook type personal computer according to an embodiment of the present invention;

FIG. 15 is a view for explaining the title name of an application displayed on the sub-display 14;

FIG. 16 is a table showing different types of status display;

FIG. 17 shows a case wherein "Internet" is displayed on the sub-display 14;

FIG. 18 shows a case wherein the jog device is pressed;

FIG. 19 shows a case wherein an application is operated by the operation buttons;

FIG. 20 shows an example wherein the title name is switched from "digital audio" to "TV" by flipping the jog device down;

FIG. 22 shows status display on the sub-display;

FIG. 23 shows status display on the sub-display;

FIG. 27 is a flow chart showing the operation when the system is ON, status indicates new arrival mail or owner string, and an application is to be started from a start menu;

FIG. 28 is a table for explaining start and operations of an application;

FIG. 29 is a table for explaining a modification;

FIG. 30 shows additional information displayed on the sub-display;

FIG. 31 shows status display on the sub-display;

FIG. 32 shows a message displayed on the sub-display by an interrupt process of an application;

FIG. 33 shows a system message displayed on the sub-display by an interrupt process of an application;

FIG. 38 shows the display states of the main display, which is opened, and sub-display when no system abnormality is detected;

FIG. 39 shows the display states of the main display, which is opened, and sub-display when a system abnormality is detected;

FIG. 40 shows the display states of the main display, which is closed, and sub-display when no system abnormality is detected; and FIG. 41 shows the display states of the main display, which is closed, and sub-display when a system abnormality is detected.

DETAILED DESCRIPTION OF THE INVENTION

First Embodiment

A notebook type personal computer according to an embodiment of the present invention will be described hereinafter with reference to the accompanying drawings.

The basic structure of the notebook type personal computer according to the embodiment of the present invention will be described first with reference to FIGS. 1 and 2.

Figure 1:
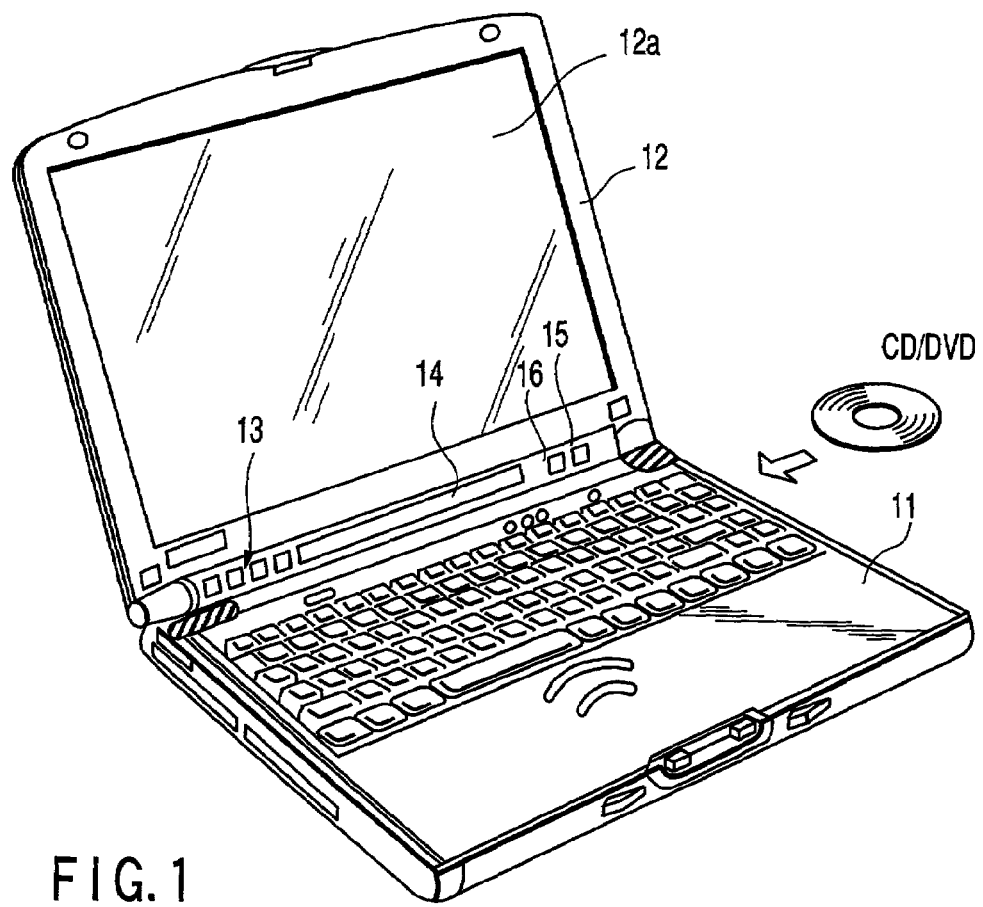
FIG. 1 is a front view of a computer with its display unit being opened.
Figure 2:
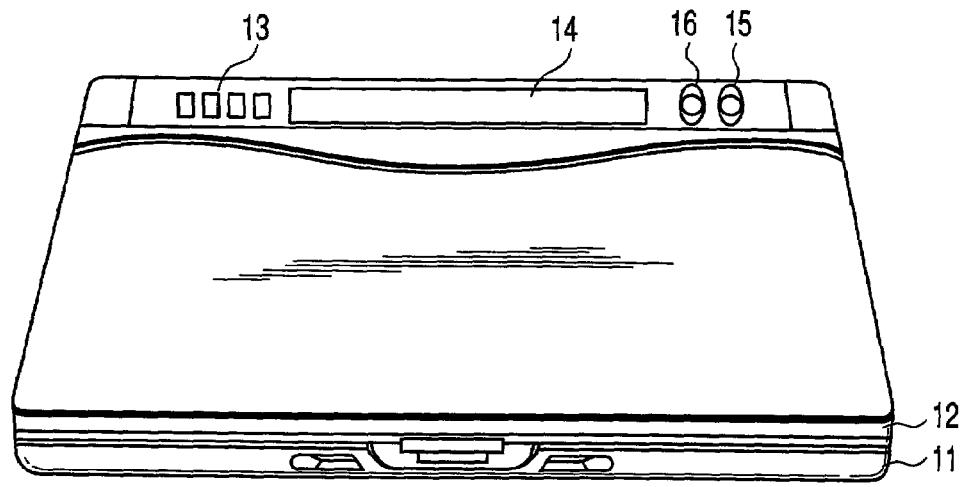
FIG. 2 is a front view of a computer with its display unit being closed.

FIG. 1 is a front view of the computer with its display unit being opened, and FIG. 2 is a front view of the computer with its display unit being closed.

The computer of this embodiment comprises a computer main body 11 and display unit 12.

The display unit 12 has a built-in display screen 12 comprising an LCD. The display unit 12 is attached to the computer main body 11 to be pivotal between the open and close positions.

The computer main body 11 has a low-profile box-shaped housing, and a keyboard, pointing stick, and the like are arranged on its upper surface.

Operation buttons 13, sub-display (sub LCD) 14, jog device 15, and volume control device 16 are provided to the upper surface of the computer main body 11.

These operation buttons 13, sub-display (sub LCD) 14, jog device 15, and volume control device 16 are externally exposed even when the display panel 12 is closed, as shown in FIG. 2.

In this embodiment, a notch is formed between the right and left hinges of the lower portion of the display panel 12, so that a back (rear) side region of the upper surface of the computer main body 11 is externally exposed even when the display panel 12 is closed.

Figure 3:
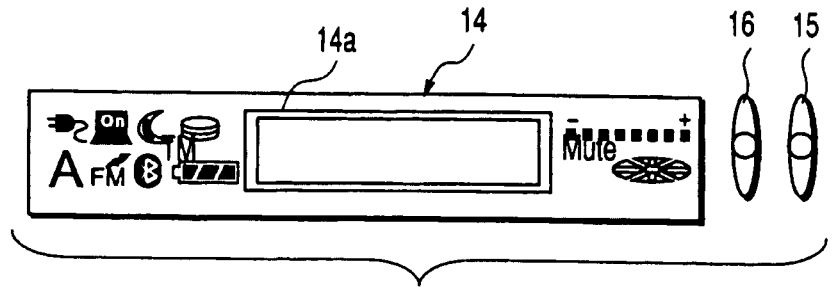
FIG. 3 shows a sub-display 14, jog device 15, and volume control device 16.

FIG. 3 shows the sub-display 14, jog device 15, and volume control device 16.

Referring to FIG. 3, the sub-display 14 displays information such as the supply state of an AC power supply, the ON/OFF state of the system, the access state of a hard disk, the battery state of the notebook type personal computer, a mute state, and the like, and has a text display unit 14a. This text display unit 14a displays various kinds of information that the user is to be informed of, as will be described later.

Figure 5:
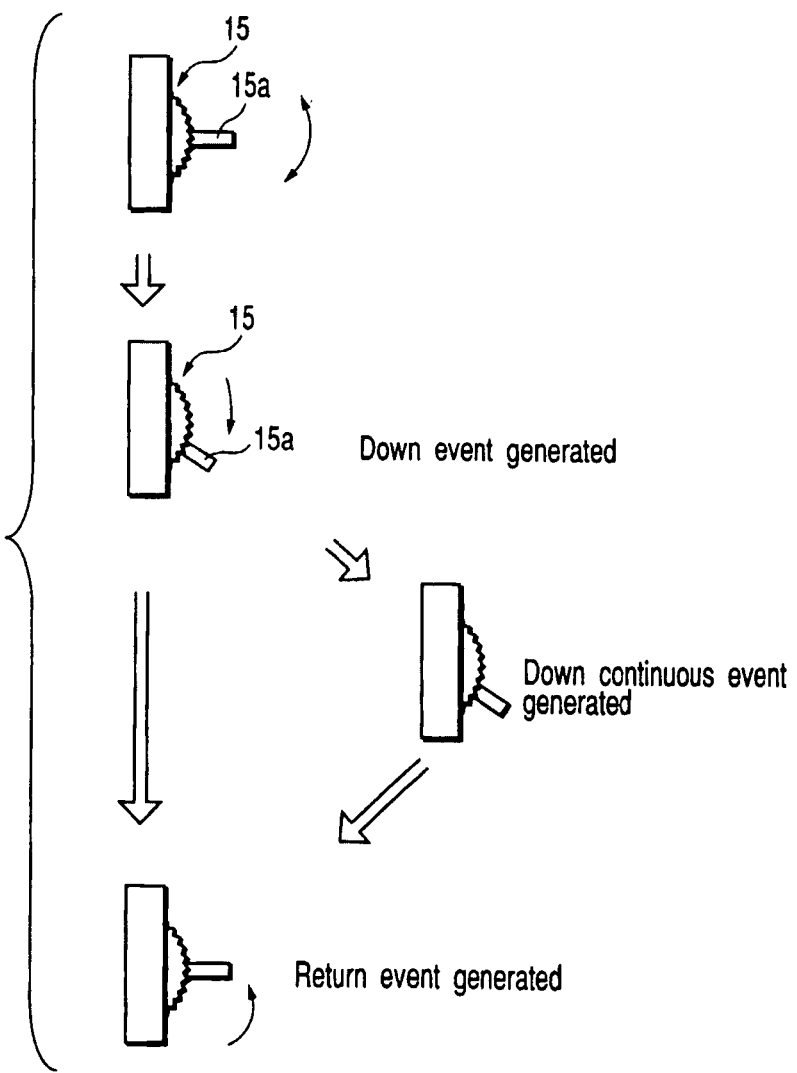
FIG. 5 is a view for explaining the relationship between the operations of the jog device 15 and events.

FIG. 5 shows the relationship between the operations of the jog device 15 and events. Note that a down event generated when a knob 15a of the jog switch (device) 15 is flipped down will be explained below. Also, when the knob 15a is flipped up, an up event is generated.

On the other hand, when the user releases the jog switch 15 immediately after a down (up) event was generated, and the jog switch 15 returns to a neutral state, a return event is generated. Likewise, when the jog switch 15 returns to a neutral state after a down (up) continue event was generated, a return event is generated.

The jog device 15 can be pressed, and generates a press event in this case. Various events from the jog device 15 are detected by a BIOS program, and are passed to an application program.

The volume control device 16 controls the volume of sound output from the notebook type personal computer.

Figure 4:
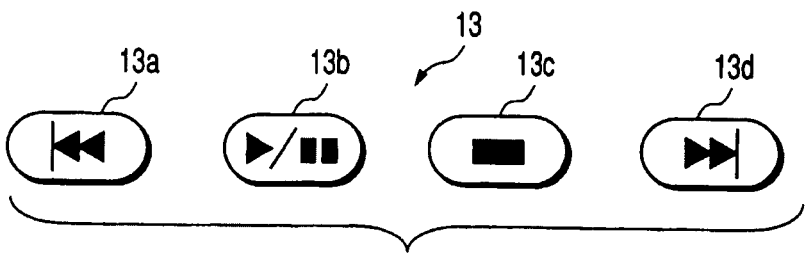
FIG. 4 shows details of operation buttons 13.

FIG. 4 shows details of the operation buttons 14. As shown in FIG. 4, the operation buttons 13 include a rewind button 13a, play/pause button 13b, stop button 13c, and fastforward button 13d.

The rewind button 13a is used to rewind a tune to be played back to the immediately preceding tune. The play/pause button 13b is used to play back a tune, and to pause playback of a tune if it is pressed during playback. The stop button 13c is used to stop playback of a tune when it is pressed during playback. The fastforward button 13d is used to fastforward a tune to be played back to the next tune.

The operation buttons 13 are used to operate an object to be operated, which is switched by a program. For example, the object to be operated may be a CD/DVD medium or a digital audio medium.

The operation buttons 13 are not limited to those shown in FIG. 4, but may be a WEB update button and the like. That is, the operation buttons 13 are used to operate an object to be operated (application program).

A disk drive (not shown) is provided to the right side surface of the computer main body 11. The disk drive receives a disk medium such as a CD-ROM or DVD-ROM that records audio data, a CD-ROM or DVD-ROM that records audio and video data, or the like as an object to be played back.

FIG. 6 shows a schematic arrangement of the notebook type personal computer according to this embodiment.

As shown in FIG. 6, a CPU 21, BIOS ROM 22, main memory 23, display controller 24, keyboard controller 27, CD/DVD player 28, HDD 29, battery 30, and power supply 31 are connected to a bus 20.

In FIG. 6, the CPU 21 controls the overall system, and executes programs stored in the main memory 23.

The BIOS (Basic Input/Output System) ROM 22 stores a BIOS program having a role of, e.g., detecting events generated by the jog device 15.

The main memory 23 stores programs and the like that implement the processes of the flow charts which will be explained later in this embodiment. The main memory 23 stores an OS (Operating System) 23a, a control program 23b for controlling display of the sub-display 14, and an application program 23c.

The display controller 24 controls display of a main display 25 and a sub-display 26.

The main display 25 is that of the notebook type personal computer, and corresponds to a display screen 12a shown in FIG. 1.

The sub-display 26 is provided independently of the main display 25, and corresponds to the sub-display 14 shown in FIG. 1.

The keyboard controller (27) controls the operation buttons 13, a keyboard 27a, and the jog device 15.

The CD/DVD player 28 plays back CD/DVD media.

The HDD 29 stores an application program and the like to be mapped on the main memory 23.

The battery 30 supplies electric power to respective components of the notebook type personal computer when no electric power is supplied from the power supply 31. Electric power from the battery 30 and power supply 31 is supplied to components which control display of the sub-display 26 to maintain the display control of the sub-display 26, even when the notebook personal computer is in a power OFF or sleep state.

Figure 7:
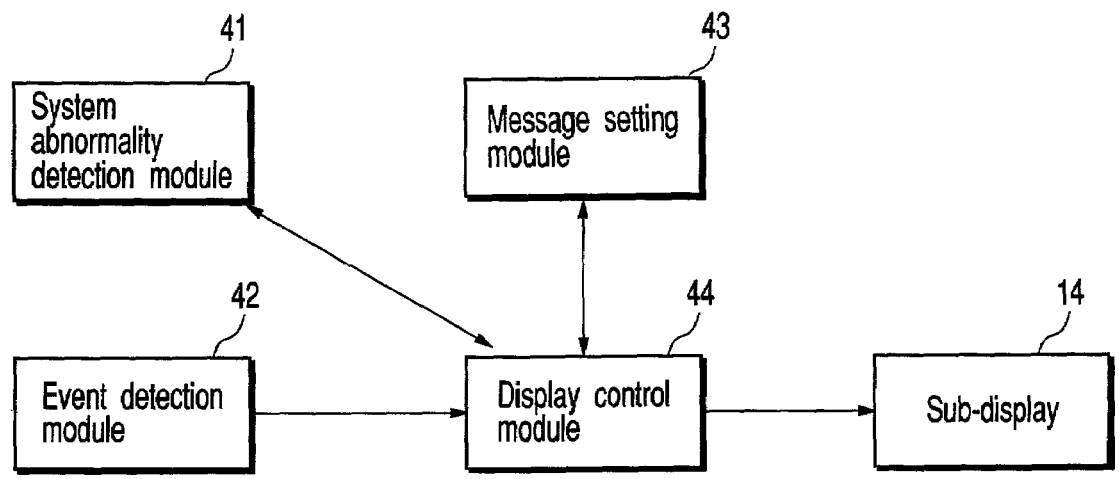
FIG. 7 is a functional block diagram of the notebook type personal computer of the embodiment.
Figure 8:
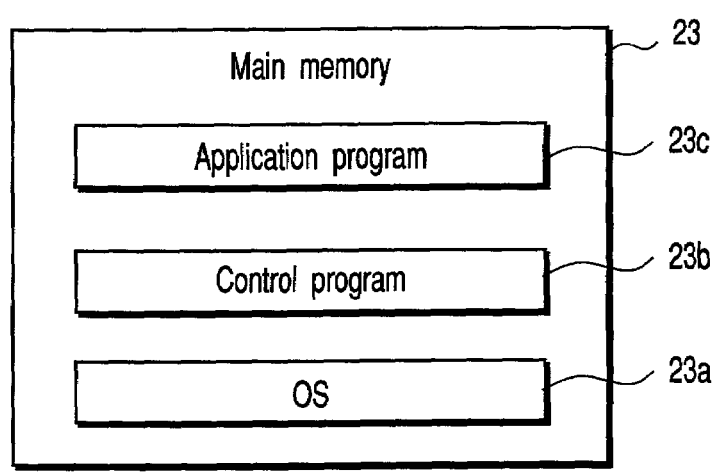
FIG. 8 shows programs stored in a main memory.

FIG. 7 is a functional block diagram of the notebook type personal computer of this embodiment.

As shown in FIG. 7, the notebook type personal computer of this embodiment has a system abnormality detection module 41, event detection module 42, message setting module 43, and display control module 44.

The system abnormality detection module 41 detects any abnormalities of the system. More specifically, the system abnormality detection module 41 detects a low battery state of the battery 30, temperature abnormality of the system, an abnormality of an application program running on the notebook type personal computer, and the like. Since the detection method itself of these abnormalities is the state-of-the-art technique, a detailed description thereof will be omitted. For example, a low battery state can be detected by detecting if the remaining amount of the battery 30 becomes equal to or lower than a predetermined amount. On the other hand, any abnormality of an application program is detected by the OS.

The event detection module 42 detects events from the operation buttons 13, jog device 15, and keyboard 27a.

The message setting module 43 is used to set the display mode of the sub-display 14.

The display control module 44 executes a display control process on the basis of the detection result of the system abnormality detection module 41, the event detected by the event detection module 42, and the display mode set by the message setting module 43, and controls the sub-display 14 to display.

The operation of the notebook type personal computer according to this embodiment will be described below with reference to the flow chart shown in FIG. 9.

Note that the operation of this embodiment is executed by electric power supplied from the battery 30 or power supply 31 not only when the system is ON but also when the system is OFF or is sleeping.

Figure 9:
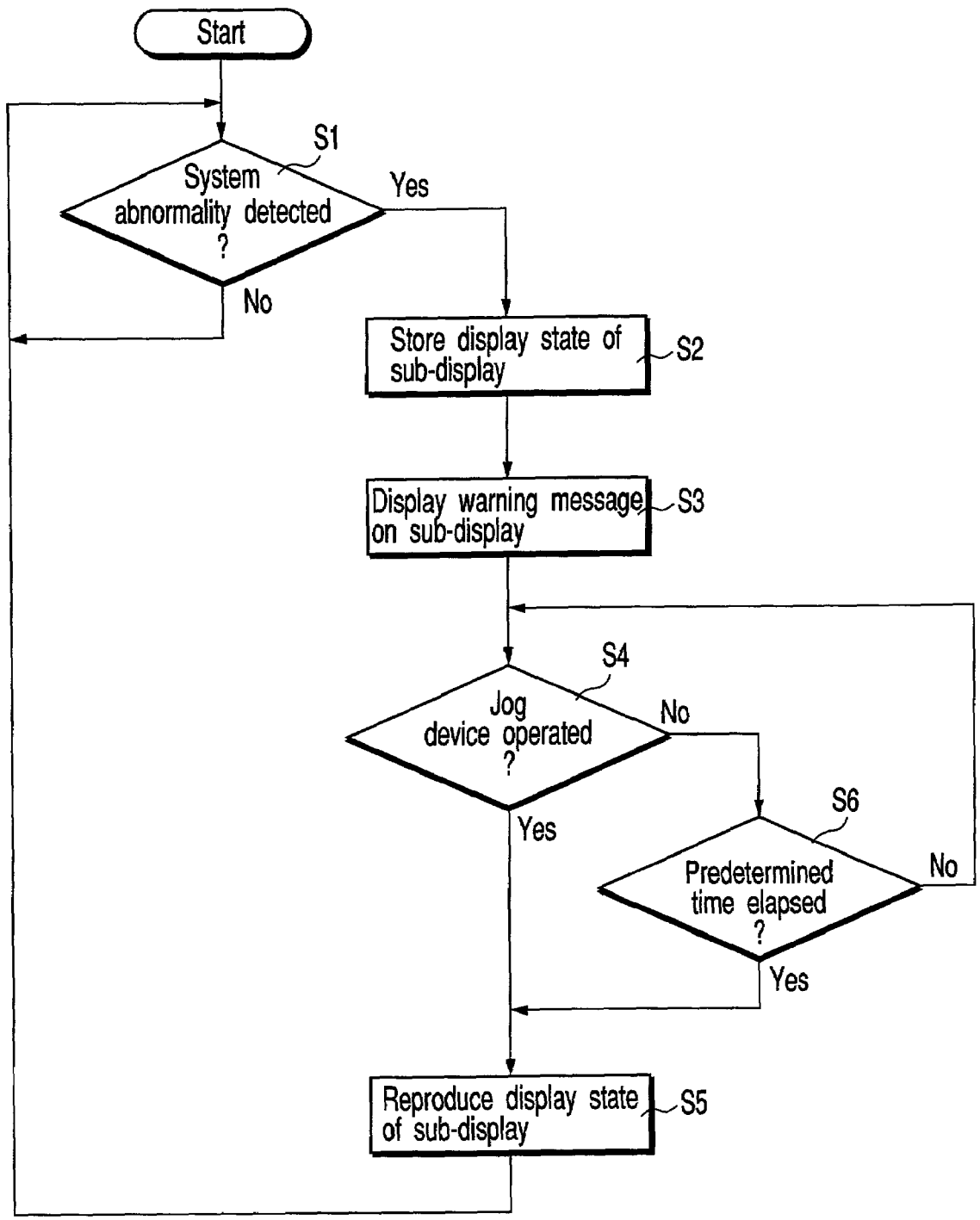
FIG. 9 is a flow chart for explaining the operation of the notebook type personal computer according to the embodiment of the present invention.

As shown in FIG. 9, it is detected if the system abnormality detection module 41 detects any system abnormality (S1). Note that the system abnormality includes, e.g., a low battery state of the battery 30, temperature abnormality of the system, an abnormality of an application program, and the like, as described above.

If any system abnormality is detected in step S1, the display state of the sub-display 14 is stored (S2). The display state of the sub-display may be stored in either the HDD or a nonvolatile memory (not shown).

A warning message is displayed on the sub-display 14. This warning message reflects the contents of a message set on a sub-display setup window (to be described later). For example, when a low battery state is detected, the sub-display 14 displays a message "low battery".

Also, the display mode of the sub-display 14 reflects values set on the setup window of the sub-display 14 (to be described later), e.g., those indicating backlight color, flickering, and the like.

It is checked in step S4 if the jog device 15 has been operated. If it is determined in step S4 that the jog device 15 has been operated, the display state of the sub-display 14 stored in step S2 is read out to reproduce the display state of the sub-display 14 (S5).

On the other hand, if it is determined in step S4 that the jog device 15 has not been operated, it is checked if a predetermined period of time has elapsed after the warning message was displayed (S6). If it is determined in step S6 that the predetermined period of time has not elapsed, the flow returns to step S4; otherwise, the flow advances to step S5. This time period can also be set on the sub-display property setup window (to be described later).

Figure 11:
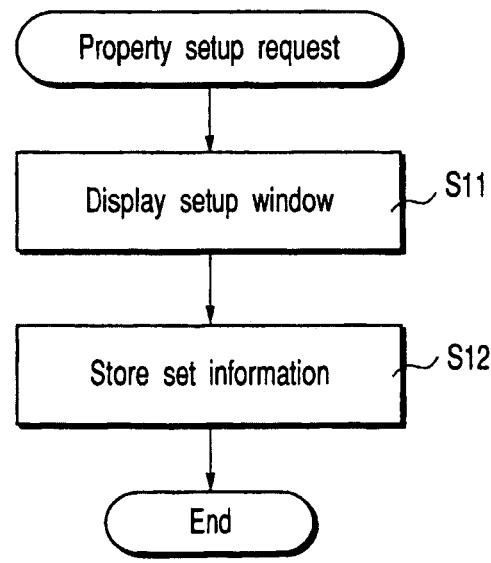
FIG. 11 is a flow chart for explaining the method of setting the display mode of the sub-display 14.

The method of setting the display mode of the sub-display 14 will be described below with reference to the flow chart in FIG. 11.

Figure 10:
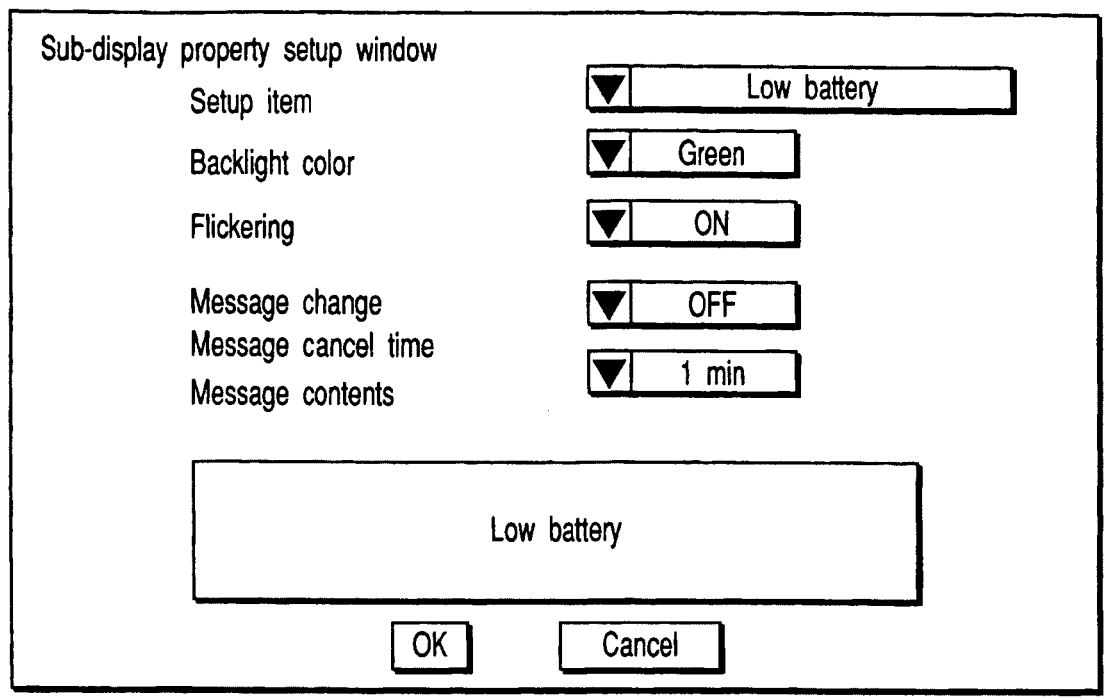
FIG. 10 shows a sub-display property setup window.

In response to a property setup request from the user, a sub-display property setup window shown in FIG. 10 is displayed (S11). On this sub-display property setup window, the user sets respective items, i.e., a setup item (low battery state, abnormality of an application program, and the like), backlight color, message change, message cancel time, and message contents. The set values are stored in the HDD 29 (S12).

The set values are reflected in a warning message on the sub-display in step S3 in FIG. 9. That is, if the property in the low battery state is set, as shown in FIG. 10, a message "low battery" flickers with green backlight. If one second has elapsed without any operation of the jog device after the message is displayed, the display state of the sub-display is reproduced.

That is, in the notebook type personal computer of this embodiment, the display mode of the sub-display can be set in correspondence with the setup item (low battery state, abnormality of an application program).

Figure 12:
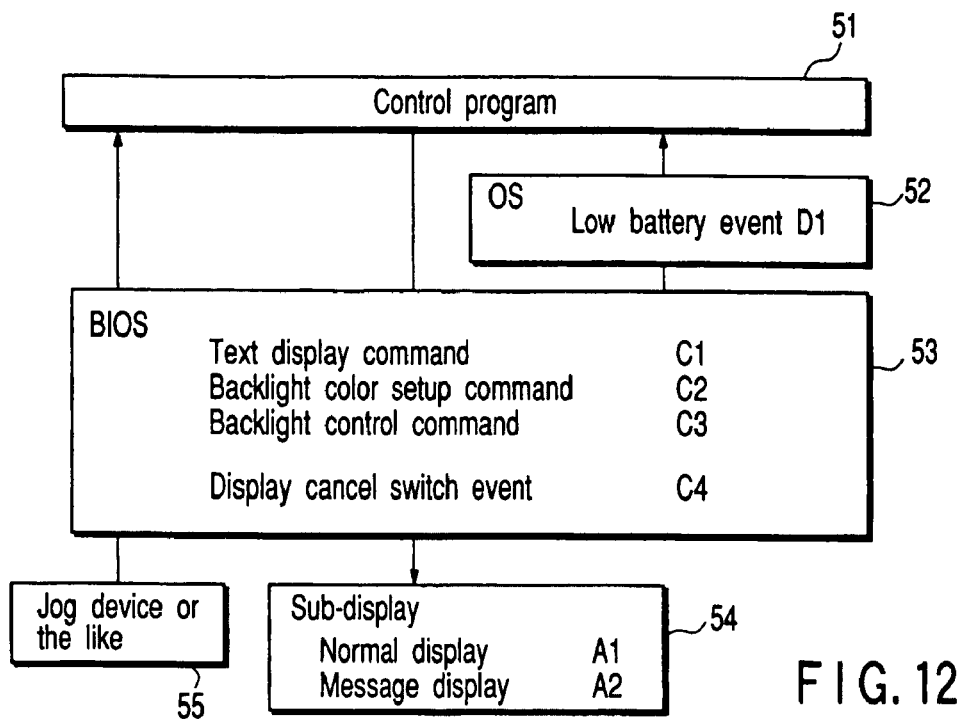
FIG. 12 is a view showing the first example of information exchanged between software programs upon displaying a low battery message.

FIG. 12 is a view for explaining the first example of information exchange between software programs in the low battery state.

A BIOS 53 intervenes an event from a jog device or the like 55 to a control program 51 and OS 52. The OS 52 informs the control program of a low battery event D1.

Upon receiving the low battery event D1 from the OS 52, the control program 51 backs up the display state of normal display A1, and displays a message indicating low battery on a sub-display 54 (message display A2) using a text display command C1, backlight color setup command C2, and backlight control command C3 (designate to flicker).

Upon pressing the jog device 55, a display cancel switch event C4 is sent to the control program 51. Upon receiving the display cancel switch event C4, the control program 51 restores the stored state of normal display A1, and displays it.

Figure 13:
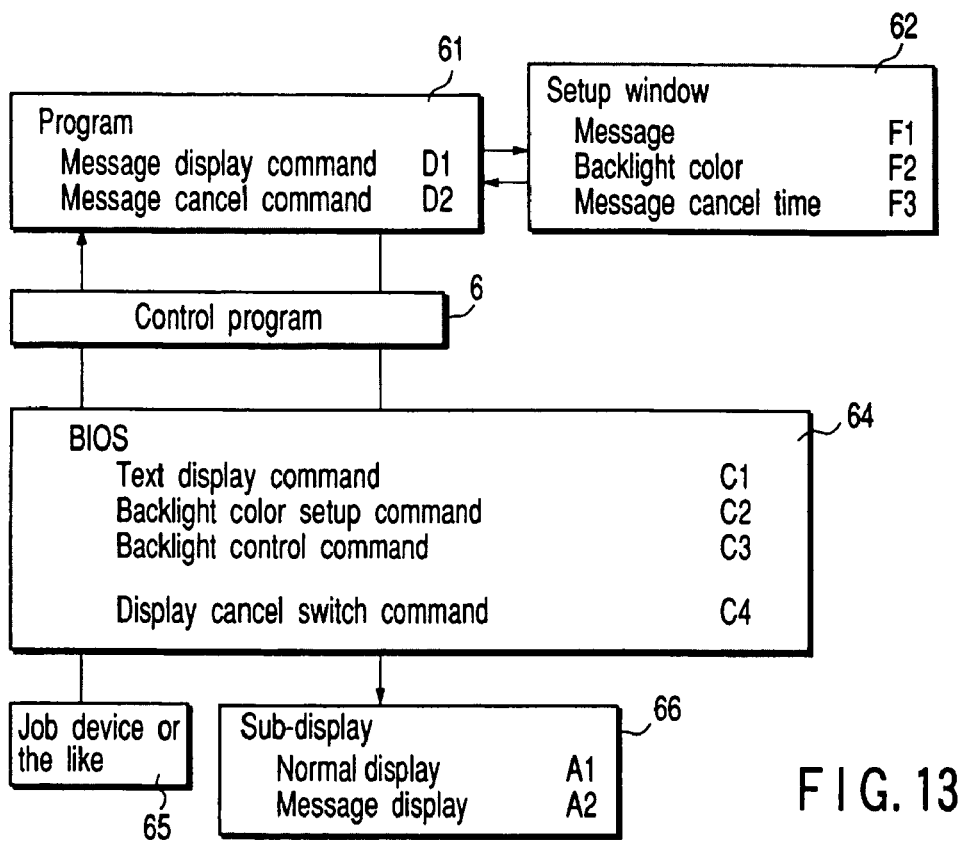
FIG. 13 is a view showing the second example of information exchanged between software programs upon displaying a low battery message.

FIG. 13 is a view for explaining the second example of information exchange between software programs in the low battery state.

On a setup window 62, a message F1, backlight color F2 of the message, and message cancel time F3 can be set.

Upon displaying the message set on the setup window 62, a program 61 sends a message display command D1 to a control program 63 in accordance with the setups (message, backlight color, and message cancel time) on the setup window 62. The control program 63 backs up the display state of normal display A1, and displays the contents corresponding to the message display command D1 on a sub-display 66 using a text display command C1, backlight color setup command C2, and backlight control command C3 (message display A2).

Upon pressing a jog device or the like 65, a display cancel switch event C4 is supplied to the control program 63. Upon receiving the display cancel switch event C4, the control program restores and displays the stored state of normal display A1.

Even when the jog device or the like 65 is not pressed, if the message cancel time F3 has elapsed, the program 61 sends a message display cancel command D2 to the control program 63. Upon receiving that command, the control program 63 restores and displays the stored state of normal display A1.

Therefore, according to the notebook type personal computer of this embodiment, even when the main display is OFF, and the system is sleeping, information that the user is to be informed of can be displayed on the sub-display.

Since the display mode of the sub-display can be set for respective setup items such as the low battery state, abnormal state of a program, and the like, the user can recognize the state of the computer from a position far from the computer on the basis of, e.g., the backlight color, the presence/absence of flickering of a message, and the like.

Second Embodiment

The operation of a notebook type personal computer according to the second embodiment of the present invention will be described below.

Since the basic hardware arrangement is the same as that shown in FIGS. 1 to 4 and FIG. 6, different operations will be described below with reference to the flow charts.

In this embodiment, some cases will be described below depending on the system state and status display on the sub-display.

<When System is OFF or is Sleeping, and no Status Display is Made>

Note that status display includes "no status display", "new arrival mail count display", and "owner string display", as shown in FIG. 16.

In a "no status display" mode, the title name of an application is kept displayed even when no application is running. In a "new arrival mail count display" mode, when no application is running while the system is active, and when the system is OFF or is sleeping, the number of new arrival mail messages is displayed. In an "owner string display" mode, when no application is running while the system is active, and when the system is OFF or is sleeping, a character string (owner string) set by the user is displayed.

<When System is OFF or is Sleeping, and no Status Display is Made>

Figure 14:
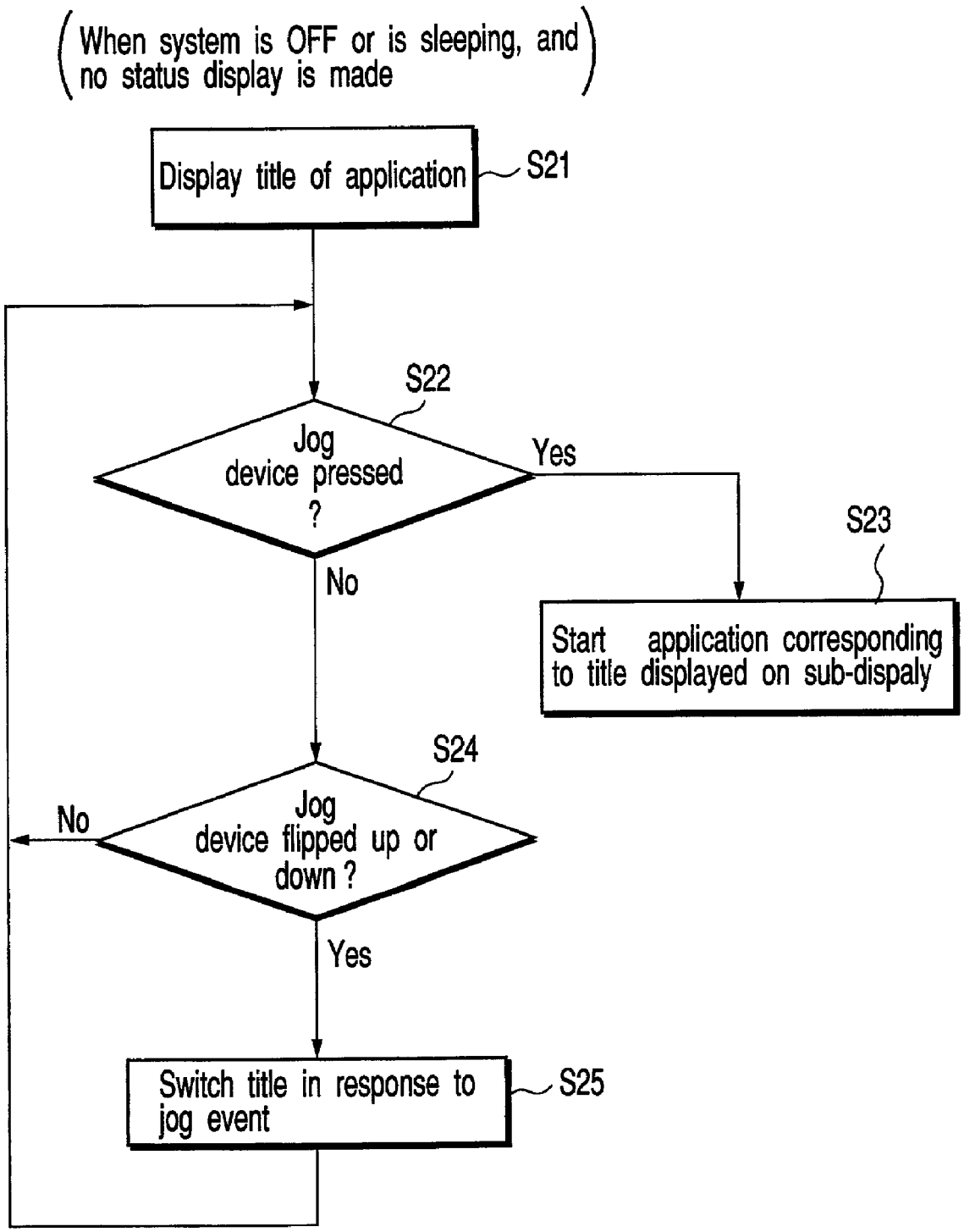
FIG. 14 is a flow chart for explaining the operation when the system is OFF or is sleeping, and no status display is made.

The operation when the system is OFF or is sleeping and no status display is made will be explained below with reference to the flow chart in FIG. 14.

In this case, normally, the sub-display 14 displays the title of an application (S21). Note that the title names of applications to be displayed on the sub-display 14 include those which are registered in advance, and those which are registered by the user, as shown in FIG. 15.

Assume that 1. CD/DVD, 2. digital audio, 3. TV, 4. application name designated by the user, 5. application name designated by the user, 6. mail, and 7. Internet are registered as the title names. The applications corresponding to these title names are to be started by the jog device 15. A case will be exemplified below wherein "Internet" is displayed on the sub-display 14, as shown in FIG. 17.

It is checked if the jog device 15 has been pressed (S22). If it is determined in step S22 that the jog device 15 has been pressed, an application corresponding to the title displayed on the sub-display 14 (Internet browser in this case) is started (S23). In this case, a message "running" is displayed under display of the title name on the sub-display 14. FIG. 18 shows a case wherein the jog device is pressed.

When the application title is not switched by the jog device 15, the jog device 15 serves as a single-action starter. Note that some application to be started is operated by the operation buttons, as shown in FIG. 19.

On the other hand, if it is determined in step S22 that the jog device has not been pressed, it is checked if the jog device has been flipped up or down (S24). If it is determined in step S24 that the jog device has been flipped up or down, the title is switched in correspondence with an event generated by the jog device (S25). FIG. 20 shows an example wherein the title name is switched from "digital audio" to "TV" by flipping the jog device down. On the other hand, if it is determined in step S24 that the jog device has not been flipped up or down, the flow returns to step S22.

<When System is OFF or is Sleeping, and Status Indicates New Arrival Mail or Owner String>

Figure 21:
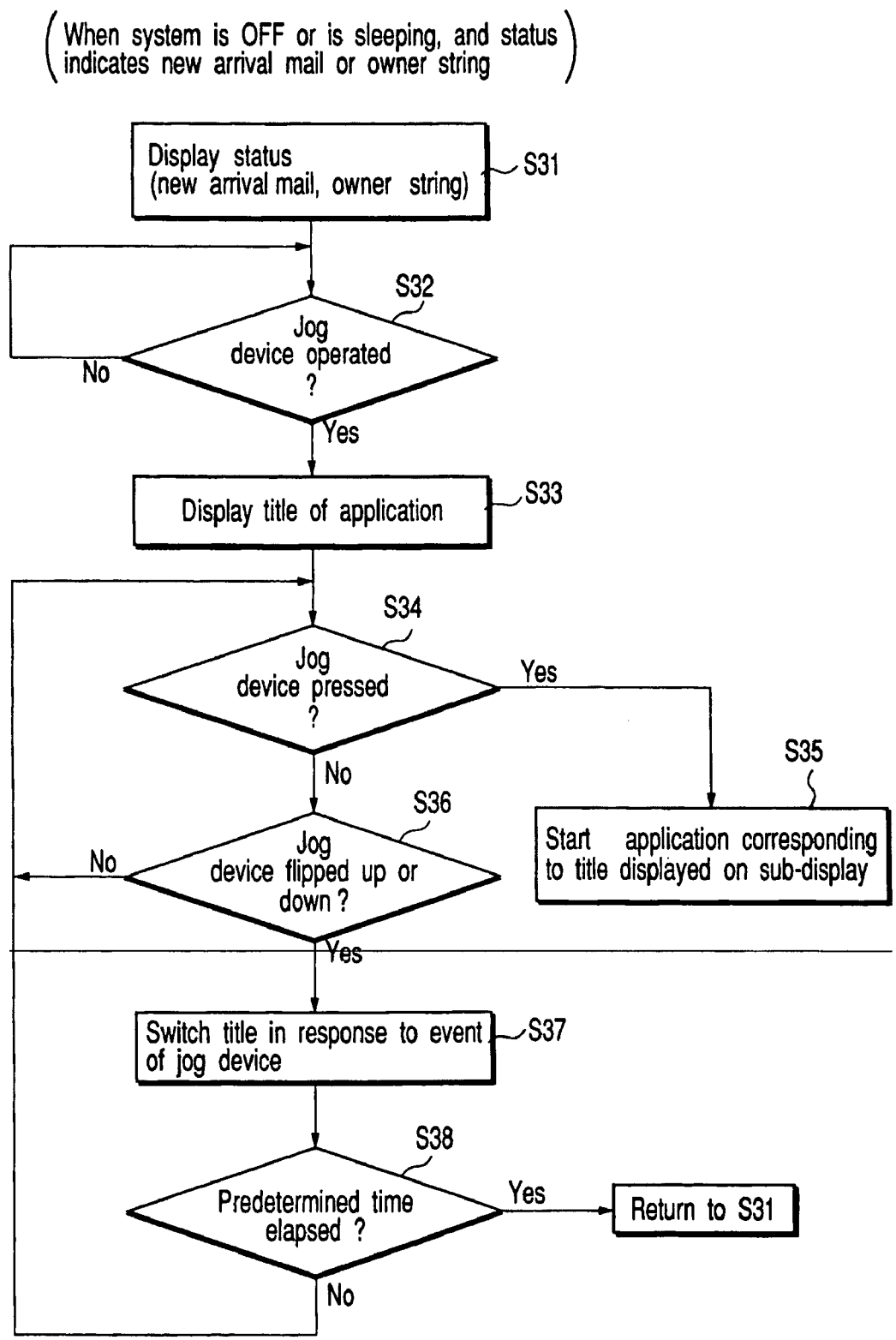
FIG. 21 is a flow chart showing the operation when the system is OFF or is sleeping and status indicates new arrival mail or owner string.

The operation when the system is OFF or is sleeping, and status indicates new arrival mail or owner string will be explained below with reference to the flow chart in FIG. 21.

In this case, normally, the sub-display 14 displays status (new arrival mail or owner string) (S31: FIG. 22 or 23).

It is checked in step S32 if the jog device has been operated. If it is determined that the jog device has been operated, the previously displayed title (e.g., CD/DVD) is displayed (S33). Note that the previously displayed title name is displayed by storing the display state before the display state of the sub-display and reading out the stored display state, as described in the first embodiment.

It is then checked if the jog device 15 has been pressed (S34). If it is determined in step S34 that the jog device 15 has been pressed, an application corresponding to the title displayed on the sub-display 14 is started (S35). In this case, a message "running" is displayed under display of the title name on the sub-display 14. Note that some application to be started is operated by the operation buttons, as shown in FIG. 19.

On the other hand, if it is determined in step S34 that the jog device 15 has not been pressed, it is checked if the jog device has been flipped up or down (S36). If it is determined in step S36 that the jog device has been flipped up or down, the title is switched in response to an event generated by the jog device (S37).

It is checked if a time set in advance by the user has elapsed (S38). If it is determined in step S38 that the predetermined time has elapsed, the flow returns to step S31. On the other hand, if it is determined in step S38 that the predetermined time has elapsed yet, the flow returns to step S34.

<When System is ON and no Status Display is Made>

Figure 24:
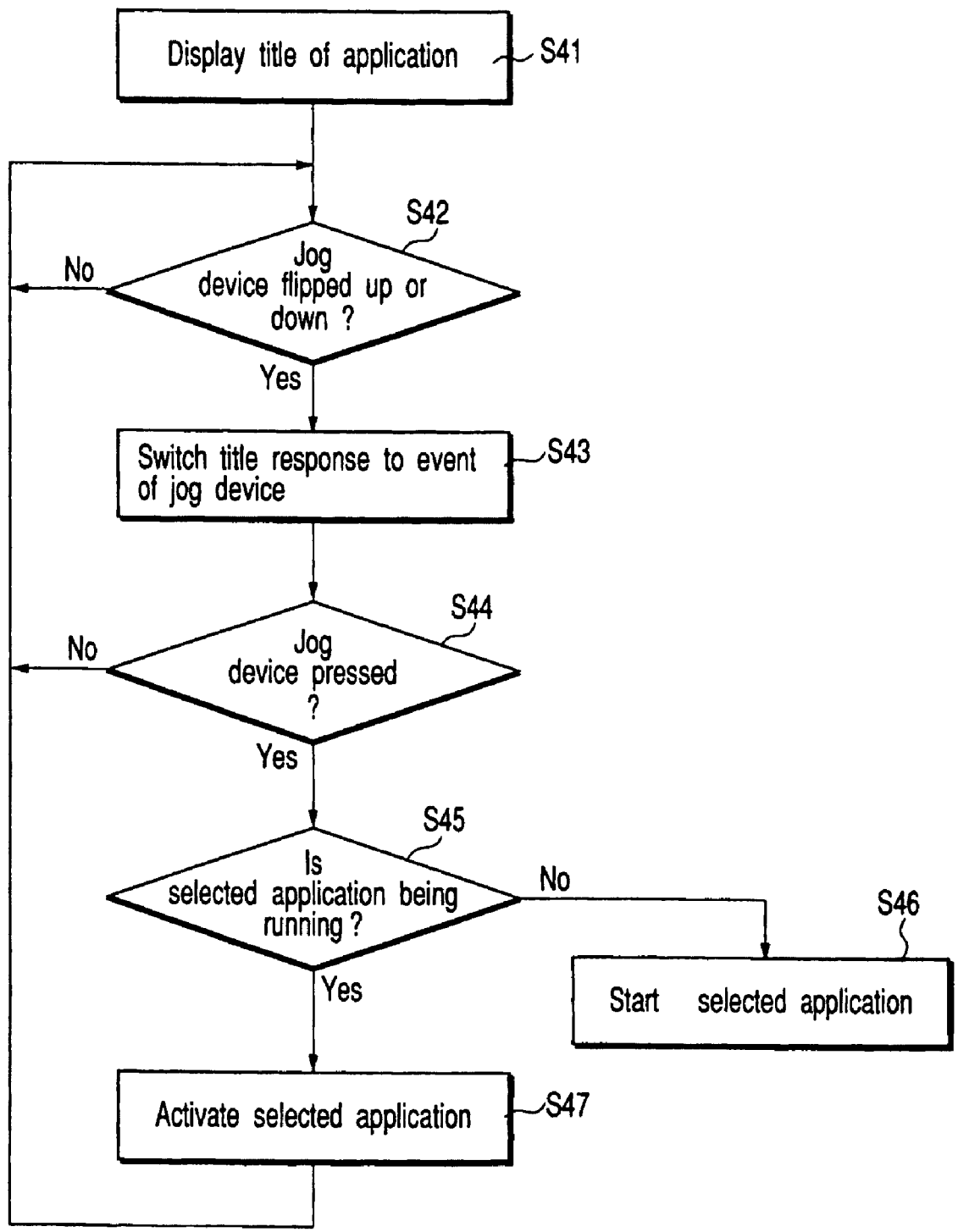
FIG. 24 is a flow chart for explaining the operation when the system is OFF and no status display is made.

The operation when the system is ON and no status display is made will be described below with reference to the flow chart in FIG. 24.

In this case, normally, the sub-display 14 displays the title of an application (S41).

It is checked if the jog device has been flipped up or down (S42). If it is determined that the jog device has been flipped up or down, the title is switched in response to an event generated by the jog device (S43).

It is checked if the jog device has been pressed (S44). If it is determined that the jog device has been pressed, it is checked if the selected application is running (S45).

If it is determined in step S45 that the selected application is not running, the selected application is started (S46). On the other hand, if it is determined in step S45 that the selected application is running, the selected application is activated (S47). In this case, the activated application becomes an object to be operated by the operation buttons.

<When System is ON and Status Indicates New Arrival Mail or Owner String>

Figure 25:
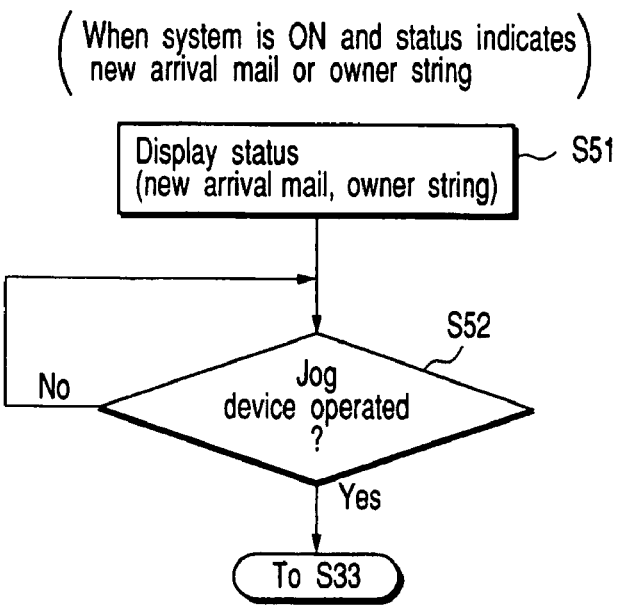
FIG. 25 is a flow chart showing the operation when the system is ON or is sleeping and status indicates new arrival mail or owner string.

The operation when the system is ON or is sleeping and status indicates new arrival mail or owner string will be described below with reference to the flow chart in FIG. 25.

In this case, normally, the sub-display 14 displays status (new arrival mail or owner string) (S51).

It is checked in step if the jog device has been operated (S52). If it is determined in step S52, the flow advances to step S33.

<When System is ON, Status Indicates New Arrival Mail or Owner String, and Application is to be Ended>

Figure 26:
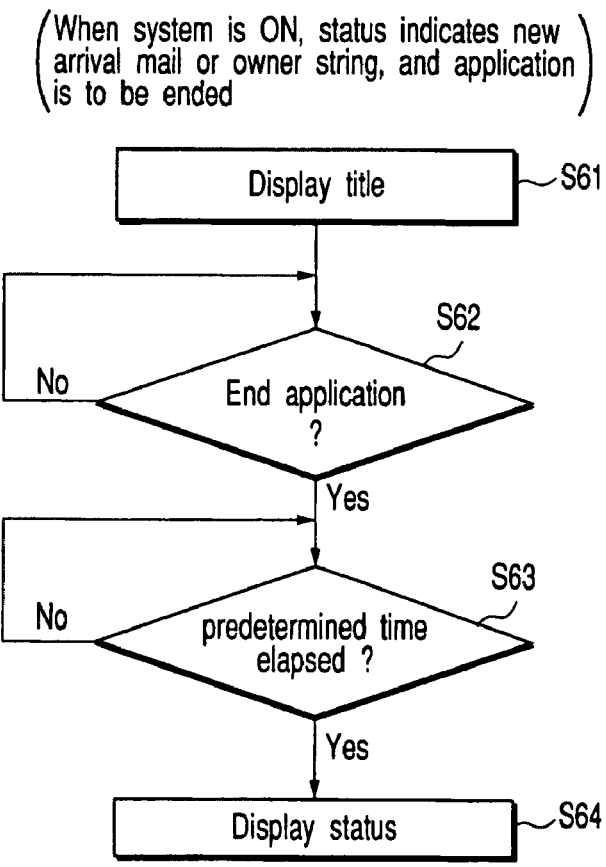
FIG. 26 is a flow chart showing the operation when the system is ON, status indicates new arrival mail or owner string, and an application is to be ended.

The operation when the system is ON, status indicates new arrival mail or owner string, and an application is to be ended will be described below with reference to the flow chart in FIG. 26.

In this case, normally, the sub-display 14 displays the title of an application (S61).

It is checked if the application is ended (S62). If it is determined in step S62 that the application is ended, it is then checked if a time set in advance by the user has elapsed (S63). If it is determined in step S63 that the predetermined time has elapsed, status is displayed again (S64).

<When System is ON, Status Indicates New Arrival Mail or Owner String, and Application is to be Started from Start Menu>

The operation when the system is ON, status indicates new arrival mail or owner string, and an application is to be started from a start menu will be described below with reference to the flow chart in FIG. 27.

In this case, normally, the sub-display 14 displays status (new arrival mail or owner string) (S71).

It is checked in step S72 if an application is started from a start menu. If it is determined in step S72 that the application is started from the start menu, the title name of the started application is displayed on the sub-display 14 (S73).

FIG. 28 is a table that summarizes start and operations of the application mentioned above. In the second embodiment, the display mode of the sub-display is set on the sub-display property setup window shown in FIG. 10, and the values set on this sub-display property setup window are reflected in status display, title name display, and the like as in the first embodiment.

<Modification>

A modification of the above embodiments will be explained below. FIG. 29 is a table for explaining the modification to be described below.

Title display will be explained first.

Title Display

In the description of the above embodiment, when no status display is made, the title name of an application is displayed. In this modification, additional information (e.g., track number, song name, song writer name, and the like) is displayed together with the title name of the application, as shown in FIG. 30.

Figure 34:
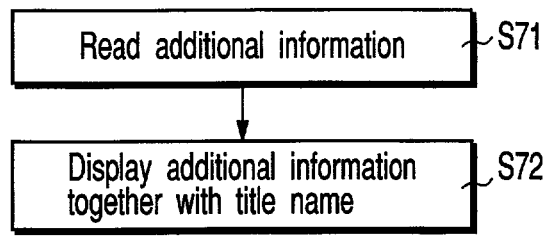
FIG. 34 is a flow chart for explaining display of additional information.

More specifically, as shown in FIG. 34, additional information is read (S71), and is displayed together with the title name (S72). If the application is one for CD/DVD media, the additional information is read from a CD/DVD medium. However, since the read method itself of the additional information is not the gist of the present invention, a detailed description thereof will be omitted.

Even when the title name of the application is switched by operating the jog device, the application continues to send additional information, which is stored in a predetermined storage area (e.g., HDD). When the previously displayed title name is displayed again, the stored additional information is displayed together with the title name.

<When Status Display Indicates Updated New arrival Mail Count, and Popup Display is Made>

Figure 35:
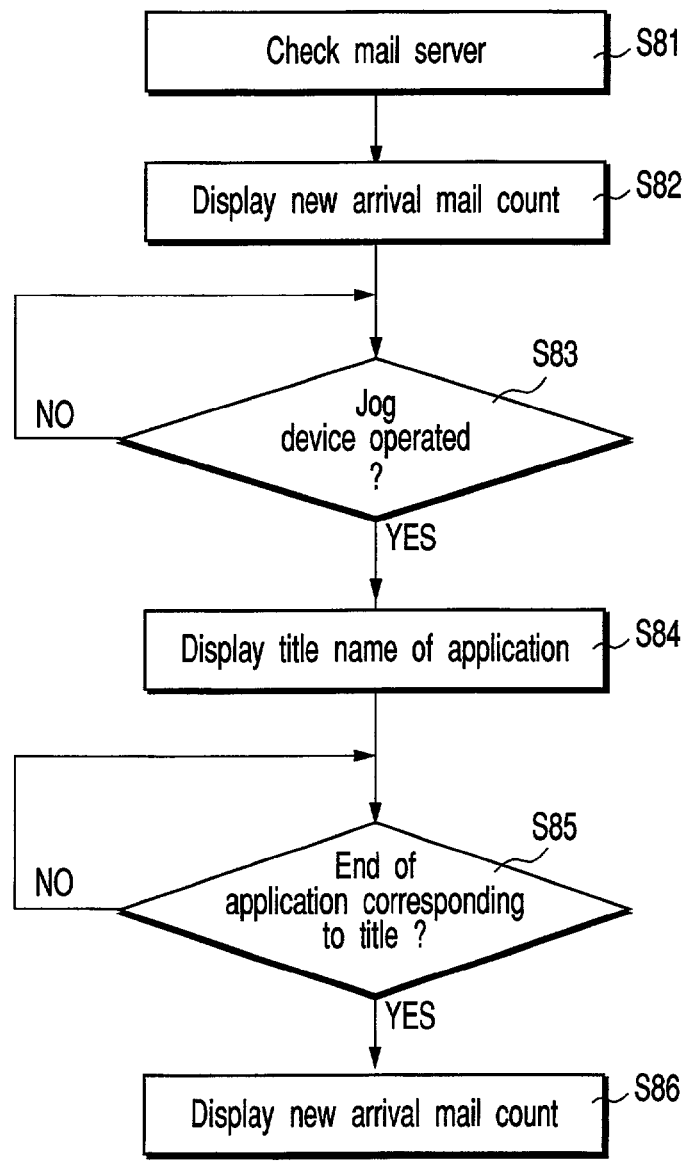
FIG. 35 is a flow chart for explaining the operation when status display indicates the updated new arrival mail count.

The operation when status display indicates an updated new arrival mail count will be described below with reference to the flow chart in FIG. 35.

The number of arrival mail messages is obtained by checking a mail server at a scheduled time (S81). The obtained result is displayed, as shown in FIG. 31 (S82). Even when another title is displayed, the new arrival mail count is displayed by an interrupt process.

It is checked if the jog device has been operated (S82). If it is determined that the jog device has been operated, the title name of the application is displayed (S84).

It is then checked if the application program corresponding to the title name is ended (or the system goes to sleep or is shut down) (S85). If it is determined that the application program is ended, the new arrival mail count is displayed (status display).

In the above description, the new arrival mail count is popup-displayed, but the present invention is not limited to this.

More specifically, even when the title of the application program is not displayed on the sub-display, the application can display a message shown in, e.g., FIG. 32 by an interrupt process. Likewise, a system message shown in FIG. 33 can also be displayed.

<Modification>

The operation of the notebook type personal computer according to a modification of the present invention will be described below with reference to the flow chart in FIG. 36.

Figure 37:
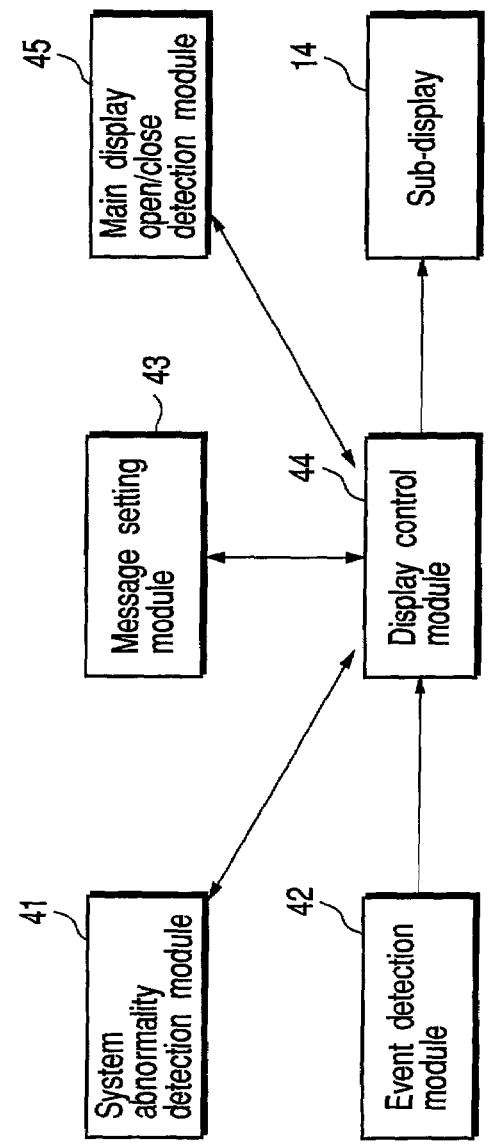
FIG. 37 is a functional block diagram of the notebook type personal computer according to the modification.

Note that FIG. 37 is a functional block diagram of the notebook type personal computer according to this modification, and the same reference numerals in FIG. 37 denote the same parts as in FIG. 7. As shown in FIG. 37, the difference from the functional block diagram shown in FIG. 7 is that a main display open/close detection module 45 is added.

This main display open/close detection module 45 detects the open/close state of the main display. Since the technique itself for detecting the open/close state of the main display is the state-of-the-art technique, a detailed description thereof will be omitted.

Figure 36:
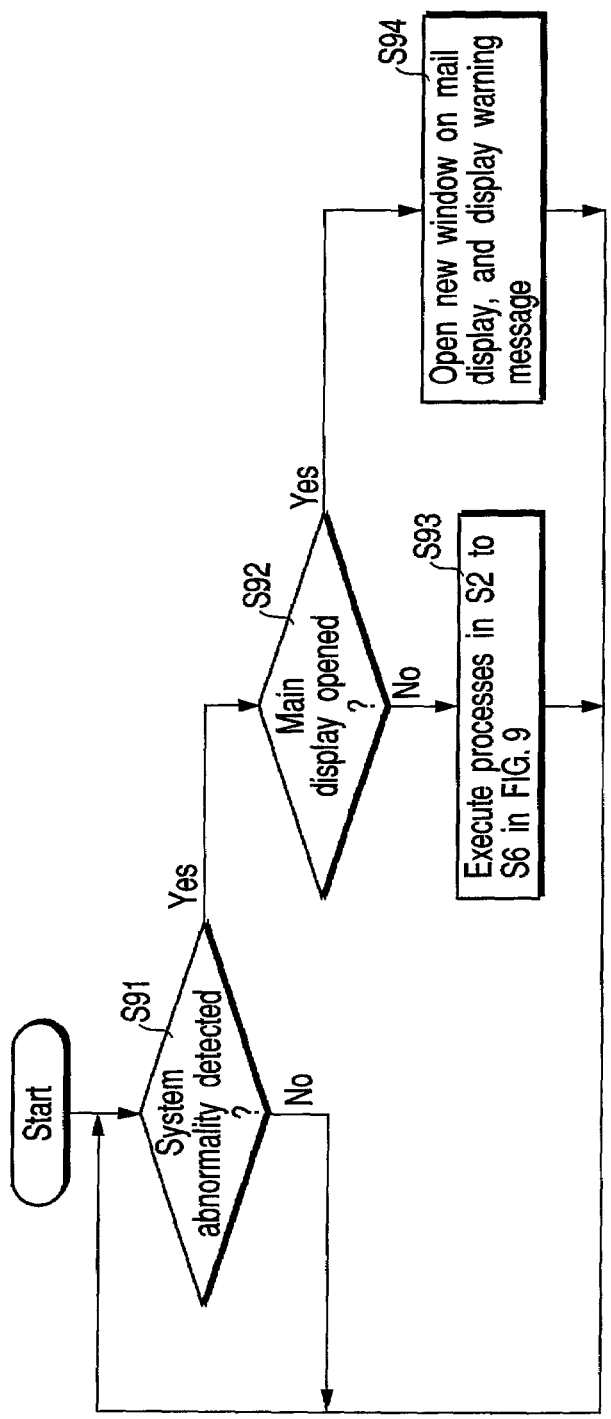
FIG. 36 is a flow chart for explaining the operation of the notebook type personal computer according to a modification of the present invention.

Referring back to the flow chart in FIG. 36, it is checked if any system abnormality is detected (S91). If it is determined in step S91 that some system abnormality is detected, it is checked if the main display is opened (S92).

If it is determined in step S92 that the main display is not open, the processes in steps S2 to S6 described using FIG. 9 are executed (S93). FIG. 40 shows a state wherein the main display is OFF, and a music playback application is running when no system abnormality is detected.

FIG. 41 shows a state wherein the main display is OFF when some system abnormality is detected. In this case, if "low battery" is detected as a system abnormality, a message "warning: low battery" is displayed on the sub-display 14 while being horizontally scrolled in place of a message "music playback in progress".

On the other hand, if the main display open/close detection module 45 detects in step S92 that the main display is opened, a new window is opened on the main display to display a warning message (S94).

FIG. 38 shows the display states on the main display and sub-display when no system abnormality is detected. In this case, assume that a window 71 of a wordprocessing application program is opened on the main display. FIG. 39 shows the display states of the main display and sub-display when any system abnormality (low battery in this case) is detected.

In this case, as shown in FIG. 39, a system abnormality warning window 72 is opened on the main display to display a system abnormality message. Also, in this case, the display state of the sub-display 14 remains the same.

Therefore, according to the notebook type personal computer according to this modification, when the main display is opened, a warning message is displayed on the main display; when the main display is closed, a warning message is displayed on the sub-display. Hence, the user can be reliably informed of system abnormalities.

In the above embodiments, the sub-display is provided at the rear position of the main body of the notebook type personal computer, where it can be seen even when the display panel is closed. Alternatively, the sub-display may be provided to the front or rear end of the notebook type personal computer.

Therefore, according to the notebook type personal computer of this embodiment, the sub-display is provided independently of the main body, and can display information that the user must be informed of in various modes even when the system is sleeping and the main display is OFF.

Since the display mode of the sub-display can be customized, when "red" backlight color is set to indicate system abnormalities and "green" backlight color is set to indicate reception of mail messages, the user can recognize the state of the notebook type personal computer from a position far from the computer.

Note that the present invention is not limited to the aforementioned embodiments, and various modifications may be made without departing from the scope of the invention when it is practiced. The respective embodiments may be combined as needed where possible, and combined effects can be obtained in such case. Furthermore, the embodiments include inventions of various stages, and various inventions can be extracted by appropriately combining a plurality of required constituent elements disclosed in this application. For example, even when some required constituent elements are omitted from all the required constituent elements disclosed in the embodiments, the omitted elements are compensated for as needed by known techniques when the extracted invention is practiced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information apparatus comprising:
   a main display;
   a sub-display provided independent of the main display and at a position where the sub-display is externally visible when the main display is in a closed position;
   a jog device that is operated to (i) select an application program and (ii) start the selected application program in one of a power-off state, a sleeping state, and a main display off state; and
   display control means that displays on the sub-display, in the power-off state, sleeping state, or main display off state, a start menu comprising a name of the application program to be selected and started.

2. A portable information apparatus according to claim 1, further comprising customizing means which customizes the number of application programs, and
   wherein the display control means displays the application programs customized by the customizing means.

3. A portable information apparatus according to claim 1, wherein when the application program displayed on the sub-display is started by the jog device, the display control means displays information other than the name of the started application program on the sub-display.

4. A portable information apparatus according to claim 1, wherein when the application program started by the jog device has finished, the display control means displays status information on the sub-display.

5. A portable information apparatus according to claim 1, further comprising detection means which detects a system abnormality of the portable information apparatus,
   wherein when the detection means detects a system abnormality, the display control means displays a message indicating the system abnormality on the sub-display.

6. A portable information apparatus according to claim 1, further comprising detection means which detects information to be notified to a user,
   wherein when the detection means detects information to be notified to a user, the display control means displays a message indicating the detected information on the sub-display.

7. A portable information apparatus according to claim 6, further comprising means for restoring a window shown on the sub-display to the window which was shown before the message was displayed, after the message is displayed on the sub-display.

8. A message display method for a portable information apparatus which comprises a main display, a sub-display provided independent of the main display and at a position where the sub-display is externally visible when the main display is in a closed position, and a jog device which generates a plurality of types of events, the method comprising:

detecting an operation of the jog device to (i) select an application program and (ii) start the selected application program in one of a power-off state, a sleeping state, and a main display off state; and displaying on the sub-display, in the power-off state, sleeping state, or main display off state, a start menu comprising a name of the application program to be selected and started.

9. The method according to claim 8, further comprising:
  customizing the number of application programs; and
  displaying the customized application programs.

10. The method according to claim 8, further comprising, when the application program displayed on the sub-display is started by the jog device, displaying information other than the name of the started application program on the sub-display.

11. The method according to claim 8, further comprising displaying status information on the sub-display when the application program started by the jog device has finished.

12. The method according to claim 8, further comprising:
  detecting a system abnormality of the portable information apparatus; and
  when the system abnormality is detected, displaying a message indicating the system abnormality on the sub-display.

* * * * *